(12) United States Patent
Lin et al.

(10) Patent No.: US 7,123,238 B2
(45) Date of Patent: Oct. 17, 2006

(54) SPACER LAYER FOR ELECTROPHORETIC DISPLAY DEVICE

(75) Inventors: Pinyen Lin, Rochester, NY (US);
David H. Pan, Rochester, NY (US);
Chieh-Min Cheng, Rochester, NY (US); David E. Holden, Canandaigua, NY (US); Adam Bush, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 639 days.

(21) Appl. No.: 09/683,547

(22) Filed: Jan. 16, 2002

(65) Prior Publication Data

US 2003/0132925 A1    Jul. 17, 2003

(51) Int. Cl.
*G09G 3/34* (2006.01)
*G02B 26/00* (2006.01)

(52) U.S. Cl. .................... 345/107; 359/296
(58) Field of Classification Search ........... 359/296; 345/107, 174; 349/153
See application file for complete search history.

(56) References Cited

U.S. PATENT DOCUMENTS

| | | | |
|---|---|---|---|
| 3,668,106 A | 6/1972 | Ota | |
| 4,272,596 A | 6/1981 | Harbour et al. | |
| 4,640,583 A * | 2/1987 | Hoshikawa et al. | 349/153 |
| 5,276,438 A * | 1/1994 | DiSanto et al. | 345/107 |
| 5,872,552 A | 2/1999 | Gordon, II et al. | |
| 6,113,810 A | 9/2000 | Hou et al. | |
| 6,222,513 B1 * | 4/2001 | Howard et al. | 345/84 |
| 6,445,489 B1 * | 9/2002 | Jacobson et al. | 359/296 |
| 6,819,316 B1 * | 11/2004 | Schulz et al. | 345/174 |
| 6,930,818 B1 * | 8/2005 | Liang et al. | 359/296 |

OTHER PUBLICATIONS

U.S. Appl. No. 09/683,534.
U.S. Appl. No. 09/683,535.
U.S. Appl. No. 10/046,194.
U.S. Appl. No. 10/046,510.

* cited by examiner

*Primary Examiner*—Richard Hjerpe
*Assistant Examiner*—Srilakshmi K Kumar
(74) *Attorney, Agent, or Firm*—Oliff & Berridge, PLC

(57) ABSTRACT

An electrophoretic display device includes a spacer layer sandwiched between two conductive film substrates, the spacer layer defining a multiplicity of individual reservoirs within the display device which are filled with a display liquid. The spacer layer preferably is one of (a) a screen in which holes within the screen define the individual reservoirs, (b) a laser punched spacer layer comprised of a sheet having holes laser punched therein in which the laser punched holes define the individual reservoirs, (c) a pocket spacer layer comprised of sheets joined together and containing a pattern of pockets within the sheets in which the pockets define the individual reservoirs, (d) an etched photoresist layer formed upon one of the conductive film substrates in which holes etched in the photoresist layer define the individual reservoirs, and (e) a composite etched layer comprised of a composite of two photoresist layers sandwiching a conductive film in which holes etched in the composite define the individual reservoirs. The device can display both monochrome and color images.

25 Claims, 13 Drawing Sheets

SPACER LAYER FOR ELECTROPHORETIC DISPLAY DEVICE

CROSS REFERENCE TO RELATED APPLICATIONS

This Application is related to U.S. patent application Ser. No. 09/683,534 (now U.S. Pat. No. 6,574,034), Ser. No. 09/683,535 (now U.S. Pat. No. 6,529,313), Ser. No. 10/046,194 (now U.S. Pat. No. 6,577,433), and Ser. No. 10/046,510 (now U.S. Pat. No. 6,525,866), each filed on Jan. 16, 2002 and incorporated herein by reference in their entireties.

BACKGROUND OF THE INVENTION

1. Field of Invention

This invention relates to spacer layers for an electrophoretic display device, and methods for making such spacer layer.

2. Description of Related Art

Electrophoretic displays, also more commonly referred to as electronic paper, are well known in the art. An electrophoretic display generally comprises a suspension of charged pigment particles colloidally dispersed in a liquid of matching specific gravity contained in a cell comprising two parallel and transparent conducting electrode panels. The charged particles are transported between the electrode panels under the influence of an electric field, and can therefore be made to display an image through appropriate application of the electric field on the electrodes. The advantages of electrophoretic displays as a means for providing information has been well appreciated in the prior art.

U.S. Pat. No. 4,272,596, incorporated herein by reference in its entirety, illustrates a typical electrophoretic display structure. The electrophoretic display device comprises a pair of electrodes associated so as to form a cavity therebetween, which cavity is filled with an electrophoretic suspension layer comprising a colored suspending medium containing colloidal sized particles in an electrically insulating liquid and finely divided electrophoretic particles suspended in the suspending medium. A source of electrical potential is coupled to the electrodes and with an electric field applied, the marking particles form an image as they follow the field. See especially FIG. 1 therein.

U.S. Pat. No. 3,668,106, incorporated herein by reference in its entirety, describes an electrophoretic display and/or recording device in which an electrophoretic suspension layer including a dispersion of at least one electrophoretic material in a finely divided powder form suspended in a suspending medium is interposed between a pair of electrodes. An electric field is imposed across the electrophoretic suspension layer to change the optical reflective property of the suspension layer by changing the spatial distribution of the electrophoretic material in the suspending medium electrophoretically.

One of the major issues still needing to be addressed in the field of electrophoretic displays is resolution of the images displayed. The present invention improves upon the resolution achievable with an electrophoretic display through design of a spacer layer used to form the individual cells of the display device.

SUMMARY OF THE INVENTION

It is an object of the present invention to develop a structure for inclusion in the electrophoretic display device that permits formation of individual cells and adequate resolution.

It is a further object of the present invention to derive a spacer layer for an electrophoretic display device that can form individual cells which house the fluid of the display device and providing adequate resolution when an image is developed in the display device.

It is a still further object of the present invention to develop cost-efficient spacer layers.

It is a still further object of the present invention to develop low cost and straightforward methods of making the spacer layers.

It is a still further object of the present invention to develop electrophoretic display devices incorporating the spacer layers, which electrophoretic display devices exhibit adequate resolution when an image is developed in the display device.

It is a still further object of the present invention to develop electrophoretic display devices incorporating the spacer layers, which electrophoretic display devices exhibit highlight colors (black plus at least one additional different color) or full colors when an image is developed in the display device.

These and other objects are achieved by the present invention, which in embodiments is directed to an electrophoretic display device comprising a unitary spacer layer sandwiched between two conductive film substrates, at least one of which is transparent, the unitary spacer layer defining a multiplicity of individual reservoirs within the display device, each of the individual reservoirs being filled with a display liquid and each of the individual reservoirs being separately addressable with an electric field.

The invention in embodiments is particularly directed to an electrophoretic display device comprising a spacer layer sandwiched between two conductive film substrates, at least one of which is transparent, the spacer layer defining a multiplicity of individual reservoirs within the display device, each of the individual reservoirs being filled with a display liquid, wherein the spacer layer is selected from the group consisting of (a) a screen in which holes within the screen define the individual reservoirs, (b) a laser punched spacer layer comprised of a sheet having holes laser punched therein in which the laser punched holes define the individual reservoirs, (c) a pocket spacer layer comprised of two sheets joined together and containing a pattern of pockets within and between the two sheets in which the pockets define the individual reservoirs, (d) an etched photoresist layer formed upon one of the conductive film substrates in which holes etched in the photoresist layer define the individual reservoirs, and (e) composite etched layer comprised of a composite of two photoresist layers sandwiching a conductive film in which holes etched in the composite define the individual reservoirs.

BRIEF DESCRIPTION OF THE DRAWINGS

FIG. 6 illustrates two sheets that contain pockets filled respectively with differently colored display liquids, while

DETAILED DESCRIPTION OF PREFERRED EMBODIMENTS

Figure 1:
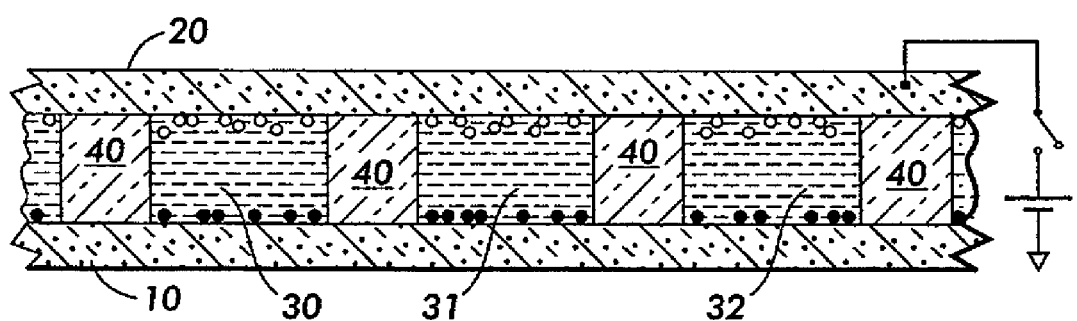
FIG. 1 illustrates a side view of an electrophoretic display device according to the invention.

As illustrated in FIG. 1, the electrophoretic display device of the invention comprises two conductive film substrates 10 and 20 disposed oppositely of each other. Between the conductive film substrates are contained a multiplicity of individual reservoirs (30, 31, 32), each filled with a display liquid described more fully below. Each of the individual reservoirs defines one cell of the electrophoretic display device. The individual reservoirs are kept separate from one another by a spacer 40.

The display device may have any suitable overall length and width as desired. Preferably, the spacer layer comprises a single, unitary layer within the device, and thus the spacer layer is manufactured to have a length and width corresponding to that of the overall device. The electrophoretic display device may also be made to have any desired height, although a total height of from about 20 to about 400 microns is preferred in terms of size and ease of use of the device.

The spacer layer of the device defines the individual reservoirs, or cells, of the device, and thus sets the resolution of the device. A resolution of 600 dpi (dots per inch) requires individual dot sizes of 42 microns. By the use of the spacer layers of the present invention, it has been found that higher resolutions can be obtained. The width and/or diameter of the individual reservoirs of the spacer layer are preferably from, for example, about 5 microns to about 200 microns. Obviously, the display liquid to be used within the reservoirs must contain particles of a size smaller than the reservoir width/diameter in order for the display to function. The solid portion of the spacer layer separating the multiplicity of reservoirs in the spacer layer, i.e., the partitions between individual reservoirs of the spacer layer, should preferably be as thin as possible. Preferred partition thicknesses are on the order of, for example, about 10 microns to about 100 microns, more preferably about 15 to about 50 microns.

In the display device, each of the individual reservoirs is preferably individually addressable, although such is not necessary. Thus, the size of the electrodes can be the same as the size of the containers, enabling individual control of each container. In this manner, the electric field of each reservoir can be individually controlled. Also, the size of the electrodes can be different from the size of the containers, thereby enabling more than one container to be controlled by a single electrode where the electrode is larger than the container or enabling only a portion of the container to be controlled (turned on and off) by an electrode where the electrode is smaller than the size of a container. That is, the pattern of the electrodes does not need to line up with the reservoirs. The foregoing can be done by, for example, appropriate patterning of the conductive path on the bottom conductive film substrate. An example of the patterning of electrodes can be found in, for example, U.S. Pat. No. 3,668,106.

As the conductive film substrates of the electrophoretic display device, any materials known and used in the art may be selected. At least one of the conductive film substrates, in particular at least the top conductive film substrate through which the images formed by the device must be viewed, should be transparent in order to enable such viewing. Both substrates may be transparent, if desired. Of course, the bottom or back substrate need not be transparent, and may instead be, for example, a light reflecting or light absorbing material. As suitable materials that may be used, mention may be made of conductive plastic films, for example plastic films, such as polyethylene terephthalate (PET) films, coated with indium tin oxide (ITO) or silver, conductive glass films, such as ITO coated glass, and conductive thin metals. For transparency, ITO coated plastic and glass films are preferred, while for etching embodiments, thin film metals are preferred at least with respect to the bottom conductive substrate.

Preferably, the substrates that sandwich the spacer layer therebetween are also made to have a length and width corresponding to the overall length and width of the electrophoretic display device. The substrates are thus preferably continuous, unitary films that are not separated over just individual reservoirs of the display device. The substrates are preferably made to be as thin as possible while still maintaining appropriate conductive properties and structural integrity. For example, the substrates should have a height (i.e., thickness) of from about 5 microns to about 100 microns.

As noted above, the spacer layer of the electrophoretic device defines the individual reservoirs of the device and is sandwiched between the conductive film substrates such that each reservoir is bordered on its sides by the partition, or solid, portions of the spacer layer and on its top and bottom by each of the conductive film substrates.

In one preferred embodiment, the spacer layer is a unitary layer, i.e., it is preferably not comprised of individual or separate spacer partitions (although such is still possible in the invention). In another preferred embodiment, the spacer layer is selected from the following embodiments, each of which is separately described below: (1) a screen in which holes within the screen define the individual reservoirs, (2) a sheet having holes laser punched therein in which the laser punched holes define the individual reservoirs, (3) a pocket spacer layer comprised of two sheets joined together and containing a pattern of pockets within and between the two sheets in which the pockets define the individual reservoirs, (4) an etched photoresist layer formed upon one of the conductive film substrates in which holes etched in the photoresist layer define the individual reservoirs, and (5) a composite etched layer comprised of a composite of two photoresist layers sandwiching a conductive film in which holes etched in the composite define the individual reservoirs.

Screen Spacer Layer

Figure 2:
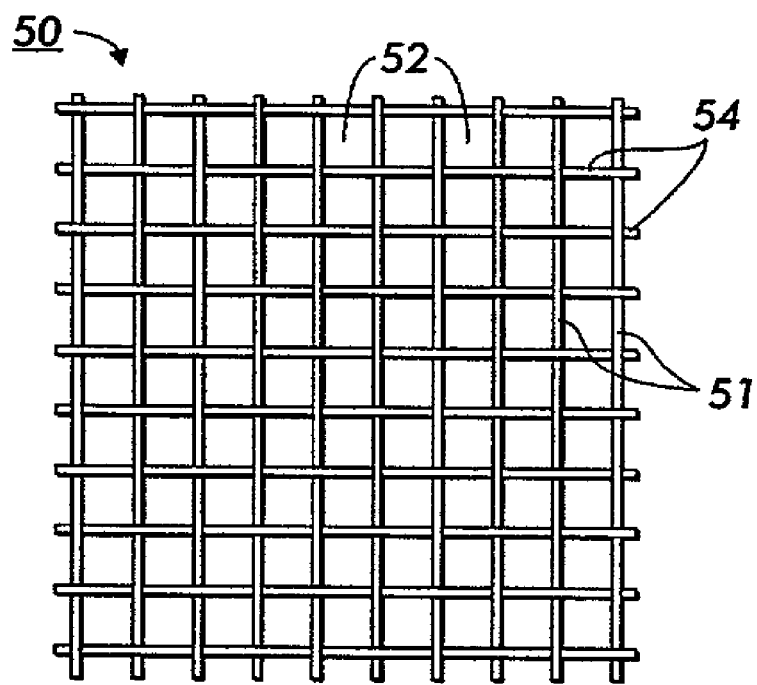
FIG. 2 illustrates a screen spacer layer in accordance with an embodiment of the invention.

A first material that can preferably be used as the spacer layer for the display device is a screen. One such screen 50 is illustrated in FIG. 2.

The screen is preferably made from fibers 51, particularly synthetic fibers such as, for example, polyamides, polypropylene, polyesters, fluoropolymers, etc. The fibers are preferably woven into the screen pattern as shown in FIG. 2. Holes 52 between the fibers of the screen form the individual reservoirs of the spacer layer. By selection of a sufficient mesh size and fiber diameter, a screen can be derived that can house the display liquid in the reservoirs while still providing adequate resolution when an image is developed. For example, mesh sizes of from about 10 to about 400 and fiber diameters from about 20 microns to about 100 microns are suitable.

When the fibers are woven, the region 54 where two intersecting fibers overlap, i.e., the fiber joints, would not adequately seal the reservoirs. That is, display liquid from one reservoir could flow into an adjacent reservoir at these points, thereby defeating the purpose of the spacer layer and degrading the display quality of the device. Thus, it is necessary to flatten the screen such that the fiber joints 54 are fused, thereby creating the individual display liquid reservoirs, prior to use of the woven screen as a spacer layer. This can be accomplished by any suitable method, preferably using a hot press using appropriate temperature conditions for the fiber used. For example, polyester fibers can be heated to about 150° C.–220° C., i.e., preferably to about 5° C. to 100° C. below the glass transition temperature or the melting point of the polymeric fibers. A pressure of from about 500 psi to about 10,000 psi may be applied for a time of about 30 seconds to about 10 minutes.

The screen can also be made by other than weaving fibers. Numerous methods are described in the screen making art, and any of these methods may suitably be used herein. For example, a screen may formed by molding or extruding a polymer material such as those polymers described above for the fibers.

Laser Punched Sheet Spacer

A second material that can be used as the spacer layer is a sheet having holes laser punched therein in which the laser punched holes define the individual reservoirs.

Figure 3:
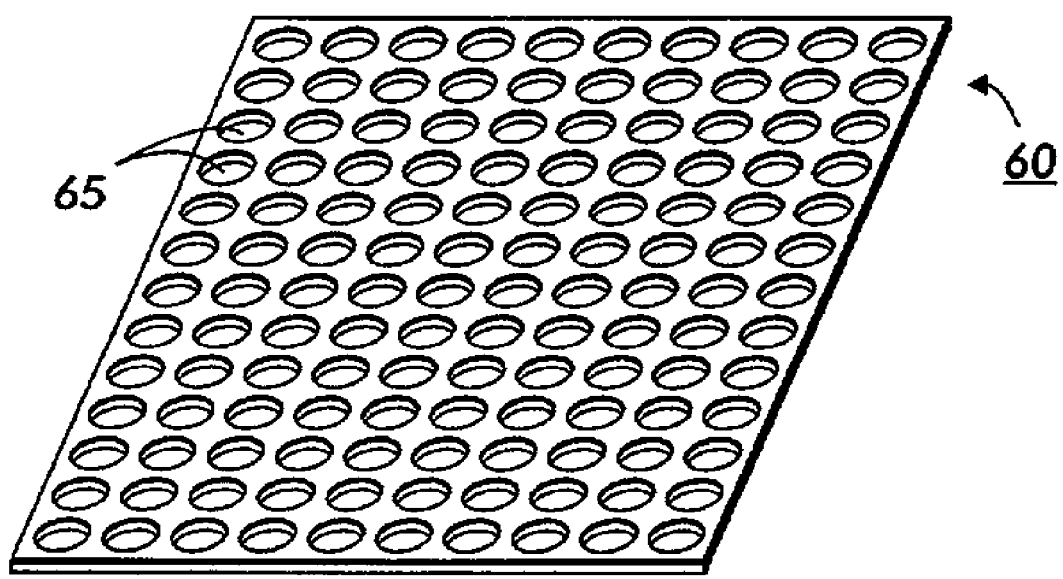
FIG. 3 illustrates a laser hole punched spacer layer in accordance with an embodiment of the invention.

Using a laser to punch holes through a film is an ideal method for forming the individual reservoirs of the spacer layer, as a laser can be programmed (i.e., the computer controlling the laser can be programmed) to guide and operate the laser such that the desired hole diameter, shape and spacing pattern is precisely controlled. FIG. 3 illustrates a laser punched sheet 60 having a desired pattern of circular holes 65 therein.

Any suitable combination of materials for the spacer layer and laser may be used such that the material is capable of being cut by the laser. The spacer layer preferably comprises a polymer material such as, for example, polyesters, polyimides, fluoropolymers, cellulose, and the like. Any suitable laser may be used, preferably one that generates light in the infrared or ultraviolet region and that removes the material by ablation (vaporization). A suitable laser may include, for example, an excimer laser, a $CO_2$ laser, and the like.

The laser is preferably programmed to form the holes in such a diameter and spacing as within the parameters outlined generally for the reservoirs above.

Pocket Spacer Layers

Figure 4:
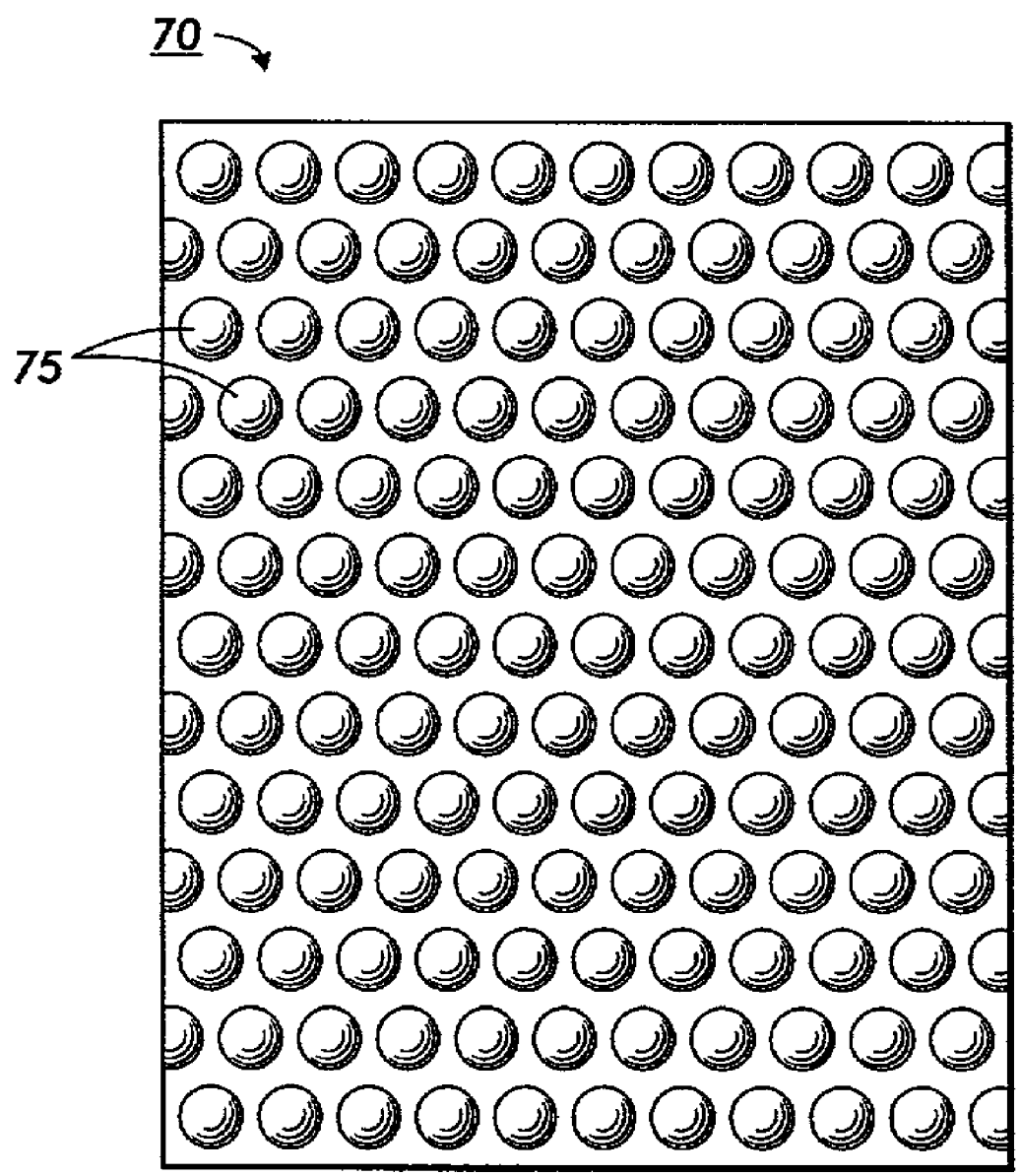
FIG. 4 illustrates a pocket spacer layer containing pockets filled with display liquid in accordance with an embodiment of the invention.

A third preferred material for use in forming a spacer layer of the display device of the invention is two sheets that are joined together and contain a pattern of pockets within and between the two sheets, in which the pockets define the individual reservoirs. Such a spacer layer 70 is illustrated in FIG. 4, the layer containing a multiplicity of pocket reservoirs 75.

The spacer layer is preferably a thin film bilayer with display liquid filled pockets or bubbles. The layer is modeled after "bubble wrap," but with a manufacturing process modification in which the bubbles are filled with the display liquid instead of air.

Figure 5:
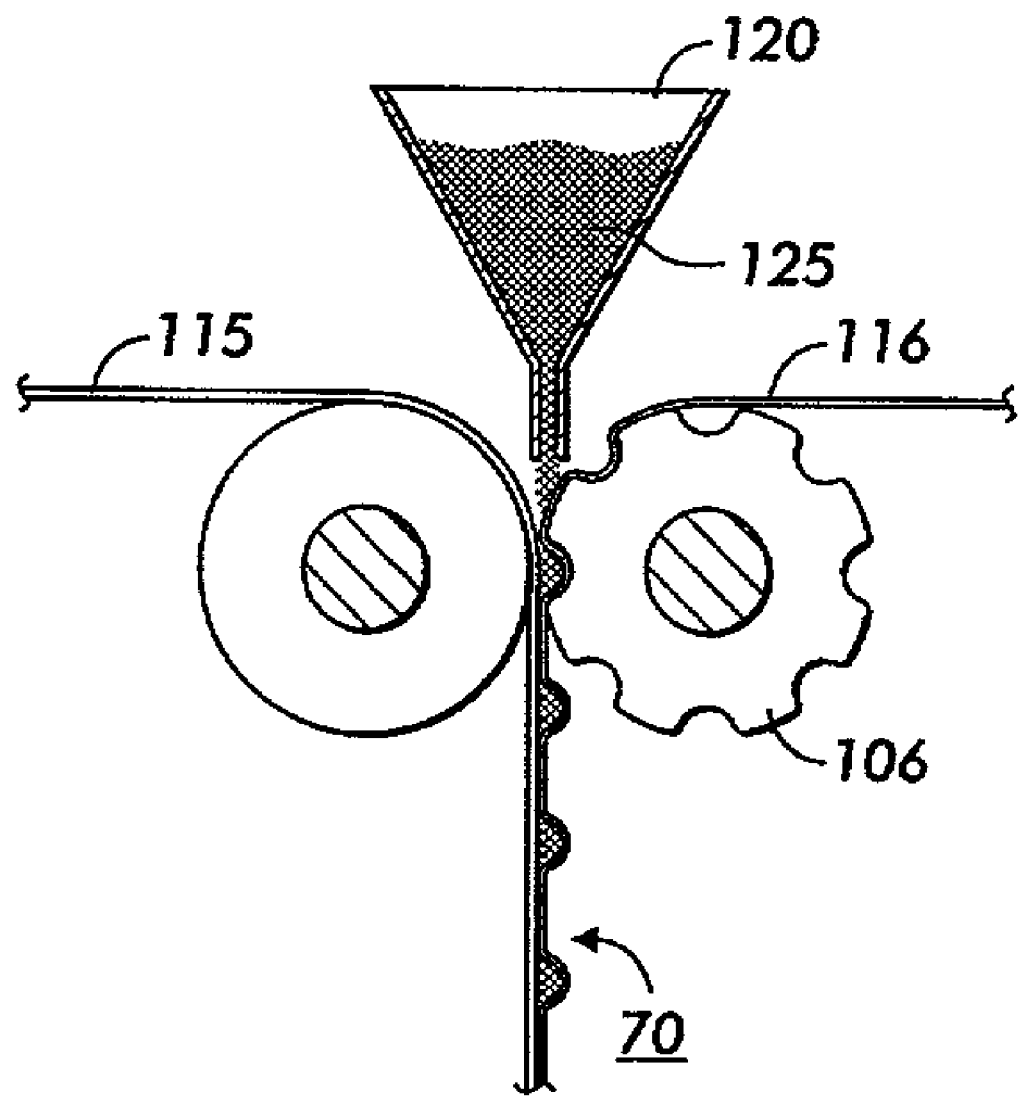
FIG. 5 illustrates an apparatus for manufacturing the sheet illustrated in FIG. 4.

While any suitable method may be used to form the fluid filled pocket spacer layer, one method of manufacturing such a layer containing pockets is illustrated in FIG. 5. As shown in FIG. 5, two rolls (105 and 106) are positioned side-by-side in abutting relationship such that each roll feeds a thin film layer (115 and 116) towards a joining point where the films are adhered together. The first roll 105 has a flat surface that feeds the bottom, first thin film layer 115. The second roll 106 has a dimpled surface which creates bubbles in the upper, second thin film layer 116, which bubbles ultimately contain the display liquid. The dimples on the surface of the roll have a size, shape and pattern that corresponds to the desired size, shape and pattern of the pocket reservoirs in the end spacer layer. Here again, the dimples have a size, shape and pattern within the parameters outlined generally for the reservoirs above. Preferably, the dimpled roll 106 has a width sufficient to form the dimple pattern across the entire width of the second film layer being fed.

Positioned over the rolls is a display liquid tank 120 that feeds, for example by gravity assisted flow, the display fluid 125 into the space between the films being adhered together. The fluid filled bubble is formed by gravity causing the liquid to expand the upper film layer into the dimples, thereby filling the pockets at the moment of adherence. Alternatively or in conjunction therewith, the pockets may also be filled by the dimpled roll 106 providing a vacuum suction that pulls the upper film into the dimple while the pockets are filling and the layers are being adhered As the pockets fill, the films are adhered together via high pressure applied by the rolls at the point of contact between the rolls. Elevated temperatures may also be used to assist in the adhering of the two films, so long as the temperature is not so high as to adversely affect the display liquid. Optional adhesives such as epoxy resins and thermoplastics can be applied to enhance the adhesion between two films.

As the materials of the films used to make the pocketed spacer layer, polymer materials are preferably used such as, for example, polyethylene, polypropylene, and the like. The surface of the films may be coated with adhesives to enhance the adhesion. The surface of the films may also be coated with low surface energy materials such as fluoropolymers to reduce the adhesion between particles and the film.

The final product is a spacer layer with display liquid filled pockets or bubbles having the desired diameter, depth and spacing from the dimpled roll.

Figure 6:
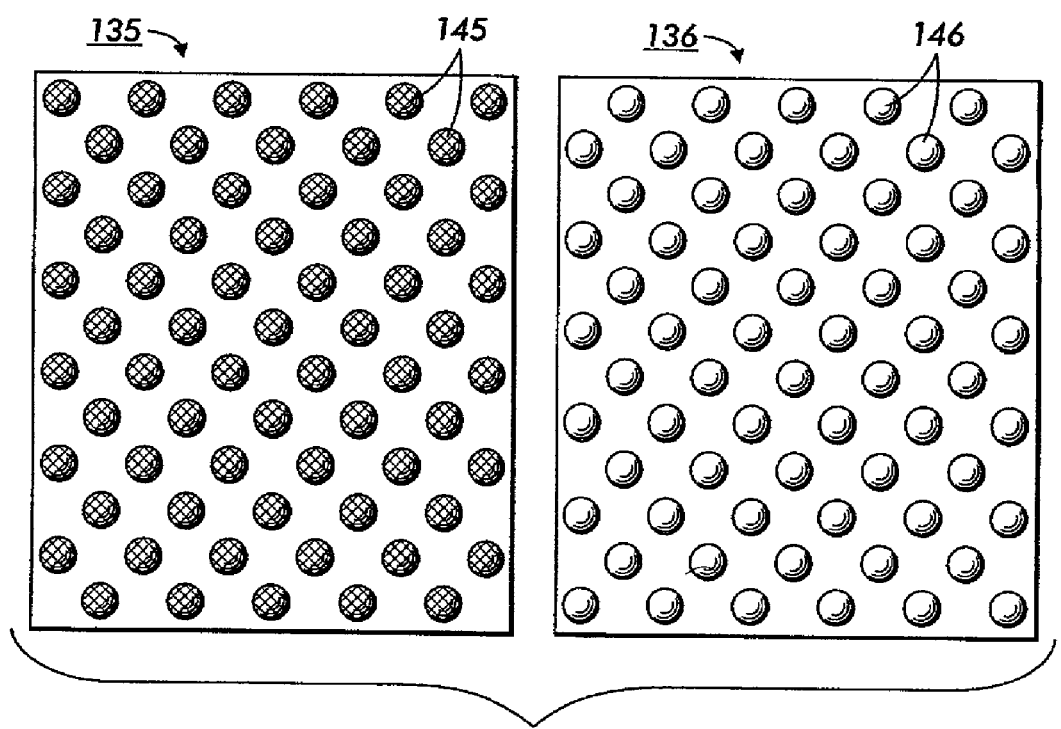
Figure 7:
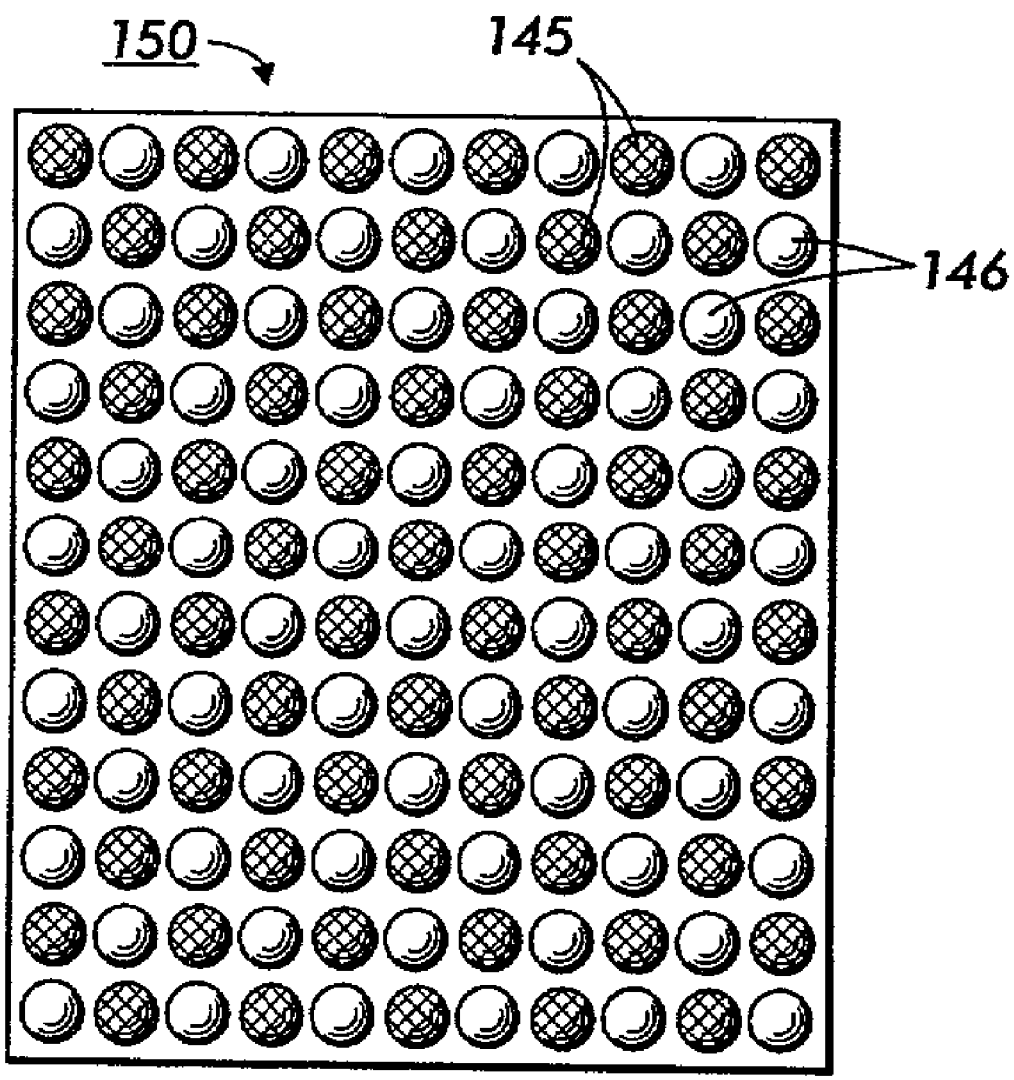
FIG. 7 illustrates a composite pocket spacer layer formed by inverting one of the two sheets of FIG. 6 and placing it on top of the other of the two sheets.

An advantage to using pocketed spacer layers is that two different colored display liquid spacer layers may be manufactured and combined, which may be particularly useful for color applications. Two different colored display liquid sheets 135 and 136 are shown in FIG. 6. Each sheet is made to have larger gaps between the bubbles (145 and 146, respectively) than the individual pocket spacer sheet described above. This can be done by creating a dimpled roll with the desired bubble pattern as described above. The patterns on each of the respective sheets are set such that when one of the sheets is inverted and placed upon the other sheet, a composite pocket spacer layer 150 is formed as shown in FIG. 7 in which none of the pockets 145, 146 from the respective layers overlap in the layer 150 and the overall pockets are spaced in the desired spacing pattern for a single spacer layer.

The end composite layer 150 is thus comprised of the two sheets 135 and 136, which have been inverted and placed in face-to-face relationship to form the spacer layer. If desired, the two sheets may be adhered together by any suitable means, although such is not necessary in that the spacer layer is fixed in location by being sandwiched between the substrates of the display device.

The spacer layer 150 is very helpful in creating color applications for electronic paper.

Figure 8:
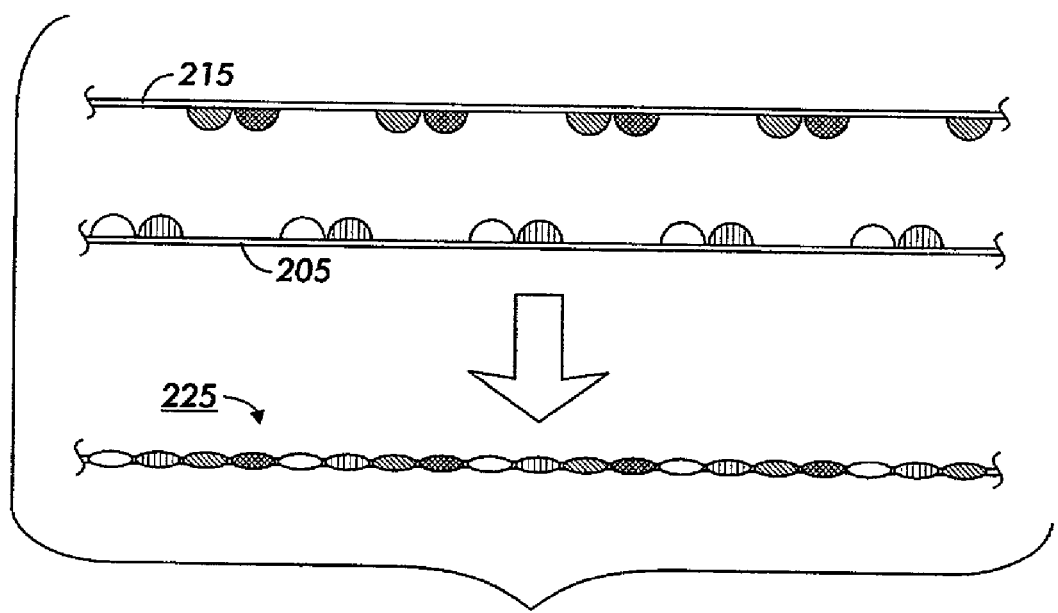
FIG. 8 illustrates a four-color spacer layer made by assembling two two-color pocket spacer layers together.

In addition to the composite two pocket color layers spacer structure discussed above, it is similarly possible to combine 3, 4, etc. color spacer layers together to achieve composite multi-color spacer structures. For example, a 4-color spacer layer 225 can be made by assembling two 2-color layers 205, 215 together, as shown in FIG. 8, for example.

The two-color display may be black plus at least one additional customer color with white as the background. The customer color is not limited to the prime colors such as cyan, yellow, or magenta. The customer color may be, for example, red, blue, purple, or the color of the customer's logo. This two-color display is called a highlight color display.

Similarly a 3-color spacer layer can be made through the above mentioned method. Thus, the electrophoretic display device may be made of a pocket spacer layer comprised of a composite pocket layer of three pocket sheets, each pocket sheet exhibiting a different color, wherein the three pocket sheets are placed atop each other and wherein there are no overlapping pockets in the composite pocket layer. Preferably, the three different colors of the pocket sheets are cyan, magenta and yellow. Further the electrophoretic display device may be made of a pocket spacer layer comprised of a composite pocket layer of four pocket sheets, each sheet exhibiting a different color, wherein the four pocket sheets are placed atop each other and wherein there are no overlapping pockets in the composite pocket layer. Preferably, the four different colors of the pocket sheets are cyan, magenta, yellow and black.

Etched Photoresist Spacer Layer

A fourth preferred embodiment for the spacer layer of the invention is comprised of a photoresist material that has been etched. Any conventional photoresist material may be used in this regard such as RISTON® from DuPont.

The etched photoresist spacer layer may be formed by first laminating the photoresist layer onto a conductive metal layer surface, i.e., the conductive metal layer of the bottom substrate, and masked. After exposure to, for example, ultraviolet light to chemically alter the photoresist at exposed portions, the mask is removed and the photoresist is etched accordingly.

By this method, a precise pattern of reservoirs of the desired size and shape can be formed in the spacer layer, for example to have sizes and dimensions as discussed in general above.

Figure 9:
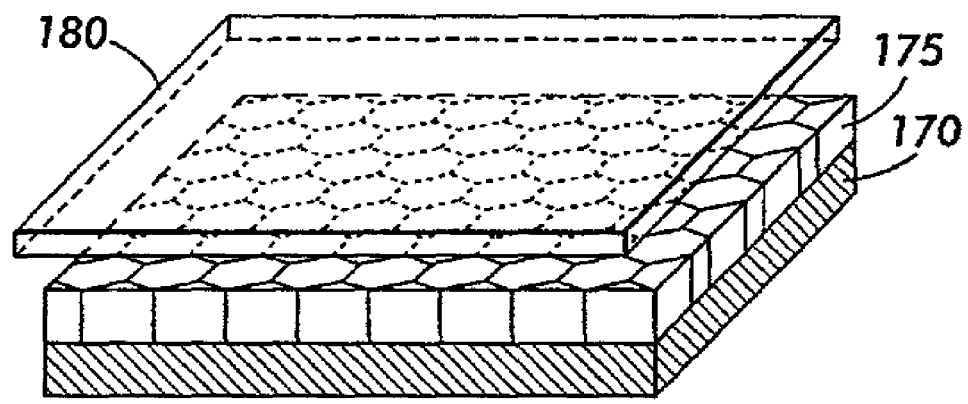
FIG. 9 illustrates a spacer layer comprised of an etched photoresist layer formed upon a conductive film substrate of the electrophoretic display device.

As shown in FIG. 9, the display device incorporating this spacer layer comprises a conductive metal substrate 170 having the etched photoresist spacer layer 175 thereon. The display device is sealed at the top with a top conductive film substrate 180 after the reservoirs formed by etching are filled with the display liquid.

Composite Photoresist Spacer Layer

A fifth preferred material for the spacer layer is comprised of a composite of two photoresist layers sandwiching a conductive film in which holes etched in the composite define the individual reservoirs. This composite photoresist may be best explained with reference to FIGS. 10–13 showing the composite at stages in the process of making the composite.

Figure 10:
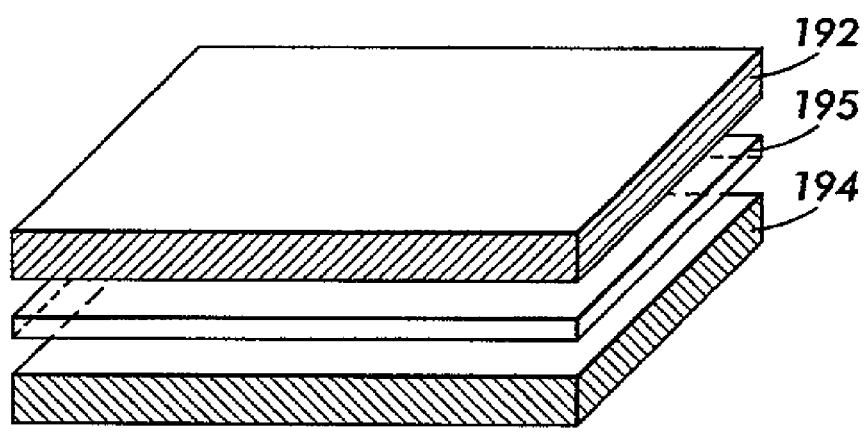
FIGS. 10–13 illustrate the steps for forming a composite etched spacer layer comprised of a metal sheet laminated on top and bottom with a photoresist film in accordance with another embodiment of the present invention.

In a first step of making the composite etched spacer layer as shown in FIG. 10, a conductive film 195, preferably a thin metal sheet, to be etched is laminated on one or both sides (both sides shown laminated in FIGS. 10–13) with a photoresist film 192, 194. Typically, the metal layer may be, for example, aluminum, stainless steel, etc., but is not limited to these materials.

Figure 11:
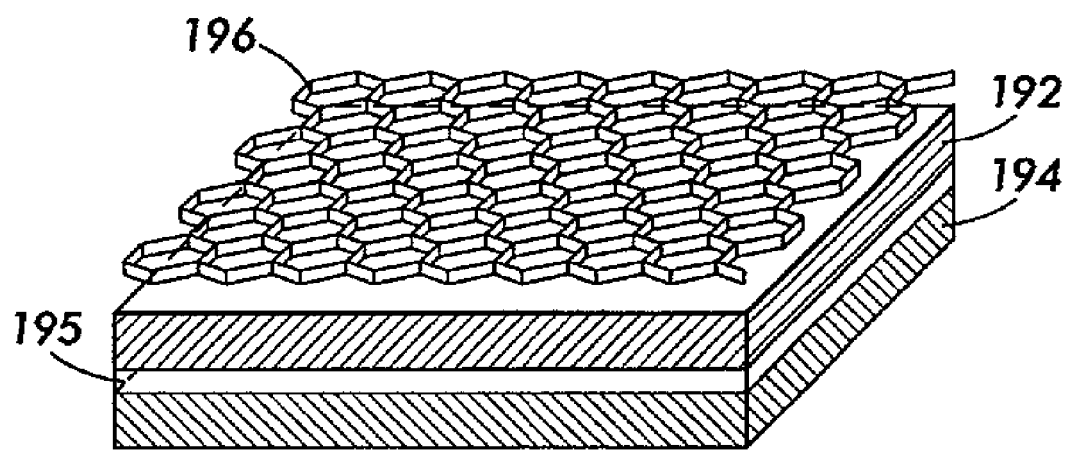
Figure 12:
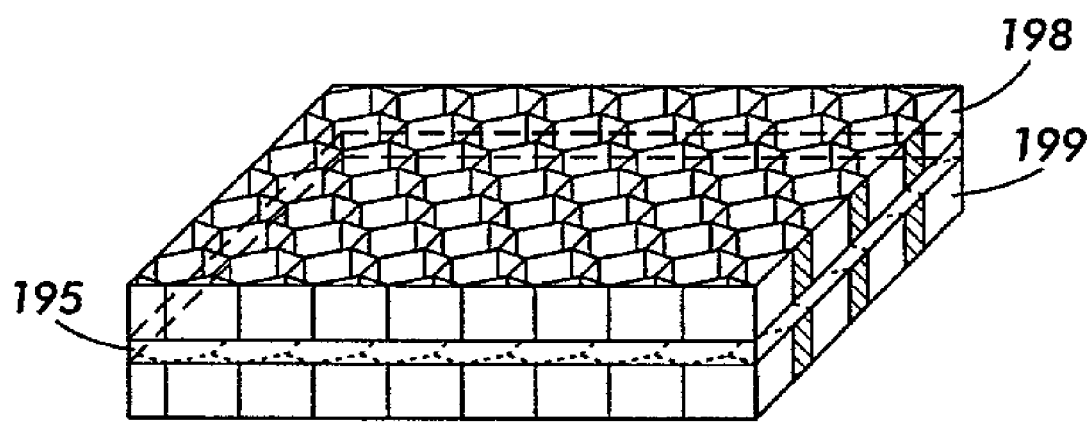
Figure 13:
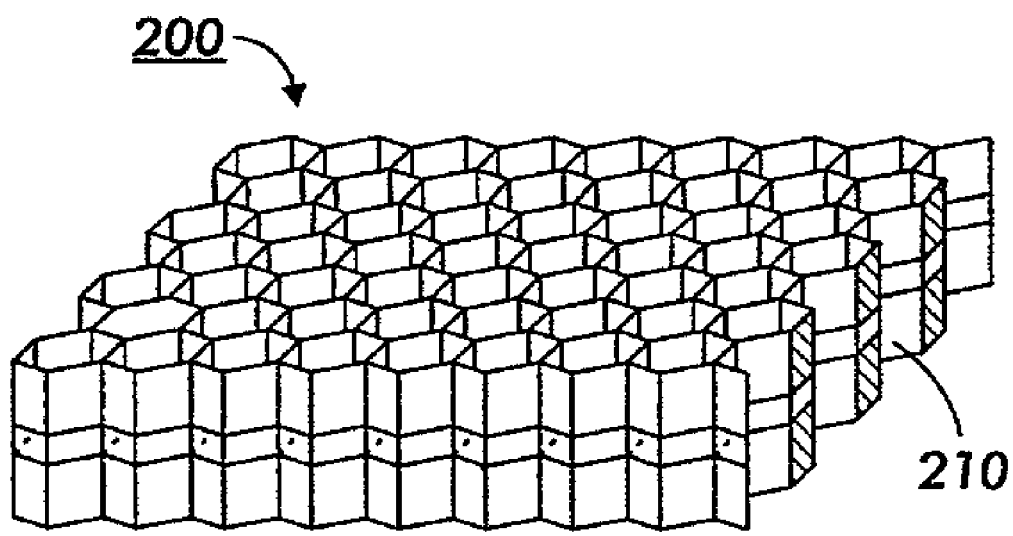

Once laminated, a mask 196 is placed upon a surface of one of the photoresist layers 192 as shown in FIG. 11, the mask having a pattern such that it covers the area where etching is not desired. The structure is then exposed to, for example, ultraviolet light that chemically alters the exposed portions of the photoresist films. The exposed, developed portions of the photoresist are then removed. This produces photoresist layers 198, 199 that are identical in appearance to the mask (FIG. 12). Unlike the mask, however, the photoresist layer is not sensitive to an acidic solution used to etch the metal layer. Thus, dipping the structure in the acidic solution etches the metal layer where no photoresist film is present, but does not etch the film where photoresist film is present. The final product 200 (FIG. 13) is a composite spacer layer with a total thickness comprised of the metal and the photoresist layer(s), and containing holes 210 etched therein and completely through the composite structure, the holes having the desired shape, size and pattern as desired as discussed above. Such composite spacer layer has very strong support due to the presence of the middle metal layer. The photoresist layers on both sides of the metal layer can provide insulation between the metal and the ITO-coated PET film.

In forming the electrophoretic display device of the invention, the reservoirs of the spacer layer are filled with display liquid and the spacer layer is attached to a first, or bottom, conductive film substrate. The filling of the reservoirs and attachment of the sheet may be done in any suitable order. When a pocket spacer layer is used, the spacer layer already contains the display liquid therein. The attachment of the spacer layer to the first conductive film substrate may be done by any suitable method. Adhesive is preferably used for convenience.

Once the reservoirs are filled with display liquid and the spacer is attached to the first conductive film substrate, the second, or top, conductive film substrate, which must be transparent, is attached to seal the reservoirs. Again, this attachment of the second conductive film substrate may also be done by any suitable means, including gluing with an adhesive.

The electrophoretic display fluid of the present invention is comprised of at least one set of colored particles dispersed in at least one liquid system.

In one embodiment of the invention, the electrophoretic display fluid comprises one set of particles dispersed in a colored liquid system, the particles exhibiting different, contrasting color to the color of the liquid. The colored liquid system may preferably comprise two immiscible liquids having different densities such that the immiscible liquid having a density less than that of the other immiscible liquid rests on top of the other immiscible liquid, and the set of particles preferably has a density in between the densities of the two immiscible liquids such that the particles rest at an interface between the two immiscible liquids, as explained in more detail below.

The liquid system may be colored by any suitable means in the art, including through the inclusion of any suitable colorants (e.g., dyes and/or dispersible pigments) therein.

In a second embodiment, the electrophoretic display fluid comprises two sets of particles dispersed in a preferably transparent liquid system (although it may be useful to also color/tint the liquid system), the two sets of particles exhibiting different, contrasting color and different charging properties from each other.

The liquid system may be comprised of a single fluid, or it may be a mixture of two or more fluids, which mixture of fluids may either be miscible with each other or immiscible as described below. The liquid system preferably contains from about 50 to about 95% by weight of the liquid system and about 5 to about 50% by weight of the sets of particles, the separate sets of particles preferably being each contained in the display fluid in approximately equal amounts. The liquid of the liquid system and the sets of particles therein preferably have densities that are matched, i.e., the densities of these materials are within about 10% of each other.

The liquid system may be comprised of any suitable liquid known in the art for display fluids. Preferably, the liquid is clear or transparent and does not itself exhibit any color, although again such is not prohibited by the present invention as discussed above. The choice of liquid may be based on concerns of chemical inertness, density matching to the particles to be suspended therein and/or chemical compatibility with the particles. The viscosity of the fluid should be relatively low to permit the particles to move therein, for example under the influence of an electrical field. The fluid is preferably dielectric and substantially free of ions. The fluid preferably has minimum solvent action on the colored particles and a specific gravity about equal to the colored particles.

Organic solvents, such as halogenated organic solvents, saturated linear or branched hydrocarbons, silicone oils, and low molecular weight halogen-containing polymers are a few suitable types of liquids. Useful organic solvents include, but are not limited to, epoxides, such as, for example, decane epoxide and dodecane epoxide; vinyl ethers, such as, for example, cyclohexyl vinyl ether; and aromatic hydrocarbons, such as, for example, toluene and naphthalene. Useful halogenated organic solvents include, but are not limited to, tetrafluorodibromoethylene, tetrachloroethylene, trifluorochloroethylene, 1,2,4-trichlorobenzene, and carbon tetrachloride. These materials have high densities. Useful hydrocarbons include, but are not limited to, decane, dodecane, tetradecane, xylene, toluene, hexane, cyclohexane, benzene, the aliphatic hydrocarbons in the ISOPAR® series (Exxon), NORPAR® (a series of normal paraffinic liquids from Exxon), SHELL-SOL® (Shell), and SOL-TROL® (Shell), naphtha, and other petroleum solvents. These materials usually have low densities. Useful examples of silicone oils include, but are not limited to, octamethyl cyclosiloxane and higher molecular weight cyclic siloxanes, poly(methyl phenyl siloxane), hexamethyidisiloxane and polydimethylsiloxane. These materials usually have low densities. Useful low molecular weight halogen-containing polymers include, but are not limited to, poly(chlorotrifluoroethylene) polymer or KRYTOX® from Dupont.

Furthermore, the liquid system may contain additives such as surface modifiers to modify the surface energy or charge of the particles. Charge control agents, charge directors, dispersants, and surfactants can also be added to suspending fluid to improve the performance of the system.

In an additional embodiment of the invention, the liquid system may be comprised of two immiscible liquids. This two-layer liquid system may be achieved using two fluids with differing densities and that are immiscible with each other. 3M's flouroether and Exxon's ISOPAR® M are a suitable combination. Flouroether, being denser, rests on the bottom, while ISOPAR®, being less dense, rests on top. The particles of the display liquid should have a density that is in between the densities of the two immiscible liquids so that they rest at the interface between the two layers to create the desired suspension.

There are several advantages of using two immiscible liquids. Firstly, the rest position of the particles is at the interface of the two immiscible liquids (which is most preferably near the middle portion of the reservoir) rather than at the bottom of the reservoir in which the display liquid is contained. This minimizes the adhesion between the particles and the reservoir (e.g., the encapsulation shell). Secondly, switching time is made faster since the particles only need to travel a portion of the distance of the reservoir, e.g., half of the distance. Thirdly, the particles rested at the interface break loose easily compared to particles resting at the bottom. This can increase the particle stability and the product life.

Thus, the display liquid may comprise, for example, a suspension of a single type of charged pigment particles in a light-transmissive fluid, for example as described in U.S. Pat. No. 5,872,552, or a dielectric dispersion comprising a dielectric fluid, a first plurality of particles of a first color having a surface charge of a selected polarity dispersed within the dielectric fluid and a second plurality of particles of a second color having a surface charge of opposite polarity to that of the first plurality and a steric repulsion thereto preventing coagulation of the first and second pluralities, for example as described in U.S. Pat. No. 6,113,810. Most preferably, however, the display liquid is of the type described in U.S. patent application Ser. No. 09/683,534 (now U.S. Pat. No. 6,574,034), filed on Jan. 16, 2002 and incorporated herein by reference in its entirety.

Images may be developed with the present electrophoretic display device as described in the above-mentioned co-pending Application, i.e., by applying an electric field of, for example, from about 0.1 volt to about 1 volt per micron gap to the reservoirs as desired so that the reservoir displays the desired color. For example, if two particles of opposite charge and visual contrast color are used, a positive electric field will orient the first set of particles at the top of the display device thus displaying the color of the first set of particles (for example, white) and a negative electric field will orient the second set of particles at the top of the display device thus displaying the color of the second set of particles (for example, black). In this manner, an image can be developed in the electronic paper.

Although the invention has been described with reference to specific preferred embodiments, it is not intended to be limited solely thereto. Rather, those having ordinary skill in the art will recognize that variations and modifications may be made therein which are within the spirit of the invention and within the scope of the claims.

What is claimed is:

1. An electrophoretic display device comprising a spacer layer sandwiched between two conductive film substrates, at least one of which is transparent, the spacer layer defining a multiplicity of individual reservoirs within the display device, each of the individual reservoirs being filled with a display liquid, wherein the spacer layer comprises at least one pocket sheeting layer comprised of at least two sheets joined together and containing a pattern of pockets within the joined sheets, and wherein the pockets define the individual reservoirs.

2. The electrophoretic display device according to claim 1, wherein each of the multiplicity of individual reservoirs has a width of about 5 microns to about 200 microns.

3. The electrophoretic display device according to claim 1, wherein the display liquid has a color and contains one set of particles with a different, contrasting color from the color of the colored display liquid.

4. The electrophoretic display device according to claim 1, wherein the display liquid is transparent and contains at least two sets of particles with different, contrasting color to each other.

5. The electrophoretic display device according to claim 1, wherein the pockets of the pocket sheeting layer are formed by dimples in one of the at least two sheets.

6. The electrophoretic display device according to claim 1, wherein the spacer layer comprises a composite comprised of a first pocket sheeting layer in which pockets are filled with a display liquid exhibiting a first color and a second pocket sheeting layer in which pockets are filled with a display liquid exhibiting a second color different from the first color, wherein the first pocket sheeting layer and the second pocket sheeting layer are placed together such that the pockets in the first and second pocket sheeting layers of the composite are substantially free of overlap at least in a direction perpendicular to a plane in which the pocket sheeting layers lie when the first and second pocket sheeting layers are placed together.

7. The electrophoretic display device according to claim 6, wherein the first color is black and the second color is an additional color.

8. The electrophoretic display device according to claim 6, wherein the first pocket sheeting layer further includes pockets therein filled with a display liquid exhibiting a third color different from the first color.

9. The electrophoretic display device according to claim 8, wherein the second pocket sheeting layer further includes pockets therein filled with a display liquid exhibiting a fourth color different from the second color.

10. The electrophoretic display device according to claim 1, wherein the spacer layer comprises a composite of three pocket sheeting layers, each pocket sheeting layer having pockets thereof filled with a display liquid exhibiting a different color from color exhibited by the other pocket sheeting layers, wherein the three pocket sheeting layers are placed together such that the pockets in the three pocket sheeting layers of the composite are substantially free of overlap at least in a direction perpendicular to a plane in which the pocket sheeting layers lie when the three pocket sheeting layers are placed together.

11. The electrophoretic display device according to claim 10, wherein a first of the three pocket sheeting layers exhibits cyan color, a second of the three pocket sheeting layers exhibits magenta color and a third of the three pocket sheeting layers exhibits yellow color.

12. The electrophoretic display device according to claim 1, wherein the spacer layer comprises a composite of four pocket sheeting layers, each of the four pocket sheeting layers having pockets thereof filled with a display liquid exhibiting a different color from color exhibited by the other pocket sheeting layers, wherein the four pocket sheeting layers are placed together such that the pockets in the four pocket sheeting layers of the composite are substantially free of overlap at least in a direction perpendicular to a plane in which the pocket sheeting layers lie when the four pocket sheeting layers are placed together.

13. The electrophoretic display device according to claim 12, wherein a first of the four pocket sheeting layers exhibits cyan, a second of the four pocket sheeting layers exhibits magenta, a third of the four pocket sheeting layers exhibits yellow and a fourth of the four pocket sheeting layers exhibits black.

14. An electrophoretic display device comprising a spacer layer sandwiched between two conductive film substrates, at least one of which is transparent, the spacer layer defining a multiplicity of individual reservoirs within the display device that are completely separated from each other, each of the individual reservoirs being filled with a display liquid, wherein the spacer layer is selected from the group consisting of (a) a screen comprised of fibers in which holes within the screen define the individual reservoirs, (b) a laser punched spacer layer comprised of a laser ablatable material in a form of a sheet having holes laser punched therein and in which the laser punched holes define the individual reservoirs, (c) an etched photoresist layer comprised of a photoresist material, formed upon one of the conductive film substrates, having a plurality of openings etched through the photoresist material, and in which the plurality of openings etched in the photoresist material define the individual reservoirs, and (d) a composite etched layer comprised of a composite of two photoresist layers each comprised of a photoresist material sandwiching a conductive film and in which holes etched through the composite define the individual reservoirs.

15. The electrophoretic display device according to claim 14, wherein the spacer layer is the screen.

16. The electrophoretic display device according to claim 15, wherein the screen is comprised of woven fibers, which have been flattened and fused at fiber joints.

17. The electrophoretic display device according to claim 14, wherein the spacer layer is the laser punched spacer layer.

18. The electrophoretic display device according to claim 14, wherein the spacer layer is the etched photoresist layer.

19. The electrophoretic display device according to claim 14, wherein the spacer layer is the composite etched layer.

20. The electrophoretic display device according to claim 19, wherein the conductive film of the composite etched layer is a metal.

21. The electrophoretic display device according to claim 14, wherein each of the multiplicity of individual reservoirs has a width of about 5 microns to about 200 microns.

22. The electrophoretic display device according to claim 14, wherein the spacer layer includes solid partition portions separating the individual reservoirs, the solid partition portions having thicknesses of from about 10 to about 100 microns.

23. The electrophoretic display device according to claim 14, wherein the device further includes a conductive path on a bottom surface of one of the conductive film substrates in a pattern such that each of the individual reservoirs are separately addressable with an electric field.

24. The electrophoretic display device according to claim 14, wherein the transparent conductive film substrate comprises a film of polyethylene terephthalate coated with indium tin oxide.

25. The electrophoretic display device according to claim 14, wherein the transparent conductive film substrate comprises a film of polyethylene terephthalate coated with silver.

* * * * *